2,737,105

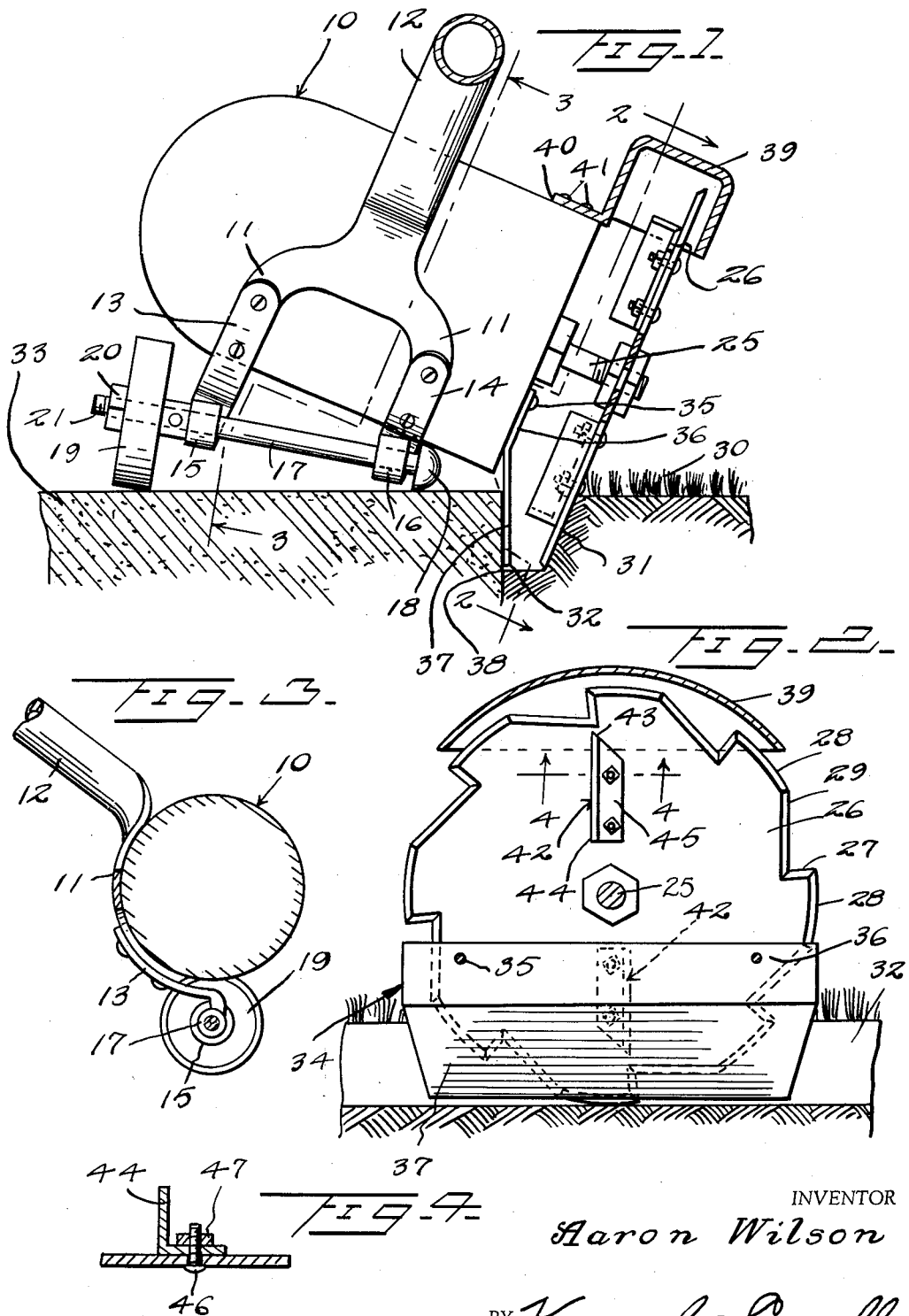

LAWN EDGER

Aaron Wilson, Eugene, Oreg.

Application March 29, 1954, Serial No. 419,400

3 Claims. (Cl. 97—227)

This invention relates to a lawn edger and has as its primary object the provision of an electrically operated edging tool for cutting the grass along the edges of walks, driveways, or the like.

A further object of the invention is the provision of an edging tool which will not only trim the grass along a walk or the like but will also rout a shallow V-shaped trench along such edges.

In a device as herein disclosed, there is provided a rotary blade secured to a shaft and a guard or shield fixedly secured to the motor to preclude contact of the blade to the edges of the walk or driveway.

Still other objects reside in the combination of elements, the arrangement of parts, and features of construction, all as will be more fully pointed out hereinafter, and shown in the accompanying drawing wherein there is disclosed a preferred embodiment of this inventive concept.

In the drawing:

Figure 1 is a rear view partially in section and partially in elevation showing one form of device embodying the instant inventive concept.

Figure 2 is a sectional view taken substantially along the line 2—2 of Figure 1 as viewed in the direction indicated by the arrows.

Figure 3 is a reduced sectional view taken substantially along the line 3—3 of Figure 1 as viewed in the direction indicated by the arrows.

Figure 4 is an enlarged sectional view taken substantially along the line 4—4 of Figure 2 as viewed in the direction indicated by the arrows.

Similar reference characters refer to similar parts throughout the several views of the drawing.

Having reference now to the drawing in detail, there is generally indicated at 10 an electric motor housing containing an electric motor adapted to be driven by any desired source of power. The motor is affixed to a pair of spaced apart arcuate brackets 11 which comprise bifurcations formed at the end of a tubular operating handle 12, the latter may terminate in the customary transverse handle member (not shown) which carries a conventional control switch (not shown).

A pair of spaced apart bracket members 13 and 14 are secured in spaced apart relation on the bottom of the motor and terminate in axle supporting loops 15 and 16, respectively, which carry an axle 17 rotatably mounted therein.

The arrangement is such that the bracket 13 is longer than the bracket 14 whereby the motor housing 10 is inclined angularly in one direction. One end of the axle 17 carries a head 18 which serves as a small wheel for facilitating movement of the device, while the other end adjacent the bracket 13 carries a relatively larger wheel 19, the latter being secured to the axle 17 as by means of a nut 20 engaging a threaded end 21 of the axle.

Positioned centrally of motor housing 10 on the lower inclined side thereof and projecting outwardly therefrom is a drive shaft 25 connected directly to the motor and rotatable thereby. The drive shaft has secured thereto a rotary blade, generally indicated at 26, which includes a plurality of steps including radial cutting edges 27, circumferential cutting edges 28, and substantially tangential cutting edges 29 connecting edges 27 and adjacent edges 28.

This multiplicity of cutting edges serves effectively to trim the grass 30 at an angle, and simultaneously to cut an angularly shaped edge 31 to a trench 32 adjacent the edge of a driveway or walk 33.

A guard member, generally indicated at 34, is suitably secured to the motor housing as by means of suitable bolts 35 and includes a portion 36 which is flush with the face of the motor, and an inclined portion 37 which when the device is in operative position, that is, angularly inclined as shown in Figure 1, is substantially vertical and adapted to abut the edge 38 of the walk or drive.

An upper guard member 39 of arcuate configuration and channel shaped cross-sectional configuration is secured to the upper side of motor housing 10, as by means of a flange 40 and bolts 41. The guard member 39 prevents accidental damage by engagement of the upper portion of the blade during rotation.

The inner side of the blade 26 carries a pair of oppositely disposed angle members 42 each provided with a digging point 43 on the transversely extending flange 44 thereof, while the opposite flange 45 lies in the plane of blade 26 and is secured thereto as by means of bolts 46 and nuts 47. The angle members 42 rotating interiorly of the blade serve to remove loose earth or the like from the trench 32.

From the foregoing it will now be seen that there is herein provided an improved lawn edger and router which safely and efficiently trims the edges of lawns along driveways or walks or the like and simultaneously routs a small drainage trench which enhances the ornamental appearance of the finished trimmed edge.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

1. A lawn edger comprising a power member having a driving shaft, a pair of bearings fixed to said member at an oblique angle relative to said shaft, a second shaft journalled in said bearings, a pair of traction wheels fixed to said second shaft, one of said wheels being smaller than the other wheel whereby to dispose said power member and said first-named shaft on an oblique angle relative to the horizontal, a toothed cutting blade fixed to the lower end of said first-named shaft, and a trench forming blade fixed to the inner side of said cutting blade.

2. A lawn edger comprising a power member having a driving shaft, a pair of bearings fixed to said member at an oblique angle relative to said shaft, a second shaft journalled in said bearings, a pair of traction wheels fixed to said second shaft, one of said wheels being smaller than the other wheel whereby to dispose said power member and said first-named shaft on an oblique angle relative to the horizontal, a toothed cutting blade fixed to the lower end of said first-named shaft, a trench forming blade fixed to the inner side of said cutting blade, and a guide plate fixed to said power member and depending therefrom for sliding engagement with an edge of a walk.

3. A lawn edger comprising a power member having a driving shaft, a pair of bearings fixed to said member at an oblique angle relative to said shaft, a second shaft journalled in said bearings, a pair of traction wheels fixed to said second shaft, one of said wheels being smaller than the other wheel whereby to dispose said power member and said first-named shaft on an oblique angle relative to the horizontal, a toothed cutting blade fixed to the lower end of said first-named shaft, a trench forming blade fixed to the inner side of said cutting blade, a guide plate fixed to said power member and depending therefrom for sliding engagement with an edge of a walk, and a shield fixed to said power member and encompassing a portion of said blade.

References Cited in the file of this patent

UNITED STATES PATENTS

| | | |
|---|---|---|
| 886,703 | Ingersoll | May 5, 1908 |
| 2,139,353 | Bruder | Dec. 6, 1938 |
| 2,312,569 | Maga | Mar. 2, 1943 |
| 2,520,408 | Irion | Aug. 29, 1950 |
| 2,537,727 | Witte | Jan. 9, 1951 |